(12) United States Patent
Wang et al.

(10) Patent No.: US 7,694,281 B2
(45) Date of Patent: Apr. 6, 2010

(54) TWO-PASS MRET TRACE SELECTION FOR DYNAMIC OPTIMIZATION

(75) Inventors: Cheng Wang, San Jose, CA (US); Bixia Zheng, Palo Alto, CA (US); Ho-seop Kim, Cupertino, CA (US); Mauricio Breternitz, Jr., Austin, TX (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1223 days.

(21) Appl. No.: 11/241,527

(22) Filed: Sep. 30, 2005

(65) Prior Publication Data
US 2007/0079293 A1    Apr. 5, 2007

(51) Int. Cl.
G06F 9/44    (2006.01)
(52) U.S. Cl. ..................................... 717/128
(58) Field of Classification Search ................... 717/128
See application file for complete search history.

(56) References Cited

U.S. PATENT DOCUMENTS

| | | | |
|---|---|---|---|
| 6,170,083 B1 * | 1/2001 | Adl-Tabatabai | 717/158 |
| 6,189,141 B1 * | 2/2001 | Benitez et al. | 717/153 |
| 6,219,827 B1 * | 4/2001 | Man | 717/128 |
| 6,295,644 B1 * | 9/2001 | Hsu et al. | 717/158 |
| 6,351,844 B1 * | 2/2002 | Bala | 717/128 |
| 6,470,492 B2 * | 10/2002 | Bala et al. | 717/128 |
| 6,519,766 B1 * | 2/2003 | Barritz et al. | 717/130 |
| 6,971,092 B1 * | 11/2005 | Chilimbi | 717/158 |
| 7,120,907 B2 * | 10/2006 | Roediger et al. | 717/160 |
| 7,290,251 B2 * | 10/2007 | Livshits | 717/143 |
| 2002/0066081 A1 * | 5/2002 | Duesterwald et al. | 717/128 |
| 2002/0104075 A1 * | 8/2002 | Bala et al. | 717/136 |
| 2002/0177947 A1 * | 11/2002 | Cayford | 701/209 |
| 2004/0220728 A1 * | 11/2004 | Cayford | 701/209 |
| 2005/0044538 A1 * | 2/2005 | Mantripragada | 717/151 |
| 2005/0050535 A1 * | 3/2005 | Roediger et al. | 717/160 |
| 2005/0071078 A1 * | 3/2005 | Yamada et al. | 701/201 |
| 2005/0149915 A1 * | 7/2005 | Wu et al. | 717/137 |
| 2005/0155018 A1 * | 7/2005 | DeWitt et al. | 717/124 |
| 2005/0155026 A1 * | 7/2005 | DeWitt et al. | 717/158 |
| 2006/0005180 A1 * | 1/2006 | Nefian et al. | 717/158 |
| 2006/0190924 A1 * | 8/2006 | Bruening et al. | 717/104 |
| 2007/0083856 A1 * | 4/2007 | Chilimbi et al. | 717/128 |

OTHER PUBLICATIONS

Cohn et al., Hot cold optimization of large windwon/NT application, Dec. 2, 1996, Proceedings of Micro29.*
Li et al., A trace-based binary compilation framework for energy-aware computing, Jun. 11-13, 2004, LCTES'04.*
Bala, Vasanth et al., "Transparent Dynamic Optimization: The Design and Implementation of Dynamo," *HP Laboratories Cambridge, HPL-1999-78*, Jun. 1999, pp. 1-102.

(Continued)

*Primary Examiner*—Wei Y Zhen
*Assistant Examiner*—Yuntao Guo
(74) *Attorney, Agent, or Firm*—Blakely, Sokoloff, Taylor & Zafman LLP

(57) ABSTRACT

A first potential hot trace of a program is determined. A second potential hot trace of the program is determined. A common path from the first potential hot trace and the second potential hot trace is selected as the selected hot trace of the program.

15 Claims, 7 Drawing Sheets

OTHER PUBLICATIONS

Suganuma, T. et al., "Overview of the IBM Java Just-in-Time Compiler," *IBM Systems Journal*, vol. 39, No. 1, 2000, pp. 175-193.

Adl-Tabatabai, Ali-Reza et al., "The StarJIT Compiler: A Dynamic Compiler for Managed Runtime Environments," *Intel Technology Journal*, vol. 7, Issue 1, Feb. 19, 2003, pp. 19-31.

Baraz, Leonid et al., "IA-32 Execution Layer: a two-phase dynamic translator designed to support IA-32 applications on Itanium®-based systems," in: *36th Annual IEEE/ACM International Symposium on Microarchitecture (Micro-36)*, 2003.

* cited by examiner

```
L0:   mov   eax,[edi]
      mov   edx,0x7efefeff
      add   edx,eax
      xor   eax,0xffffffff
      xor   eax,edx
      add   edi,0x4
      test  eax,0x81010100
      jz    L0
L1:   mov   eax,[edi-0x4]
      test  al,al
      jz    L3
L2:

L3:   sub   edi,0x4
      mov   esi,[esp+0x14]
      test  esi,0x3
      jnz   L6
L4:   mov   ebx,ecx
      shr   ecx,0x2
      jnz   L10
L5:   jmp   L7
L6:
L7:   mov   ecx,ebx
      and   ecx,0x3
      jz    L9
L8:
L9:
L10:
```

TWO-PASS MRET TRACE SELECTION FOR DYNAMIC OPTIMIZATION

TECHNICAL FIELD

Embodiments of the invention relate to the field of computer systems and more specifically, but not exclusively, to two-pass Most Recent Execution Tail (MRET) trace selection for dynamic optimization.

BACKGROUND

In recent years, there has been increasing interest in dynamic binary translation and runtime optimization. Dynamic binary translation and optimization is a technique that translates and optimizes binary code at runtime for compatibility and performance improvement. The basic idea is to identify the most frequently executed code of a program as a hot trace and optimize the hot trace code based on runtime profiling information.

Typically, a dynamic optimizer monitors a program execution, identifies hot traces within the program, and performs optimizations of these hot traces. The optimized hot traces may be placed in an instruction cache so that subsequent executions of hot traces may be run in their optimized forms from the instruction cache. The performance results of a runtime optimized program depend greatly on the hot trace selection techniques.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a diagram illustrating a trace in accordance with an embodiment of the present invention.

DETAILED DESCRIPTION

Figure 2:
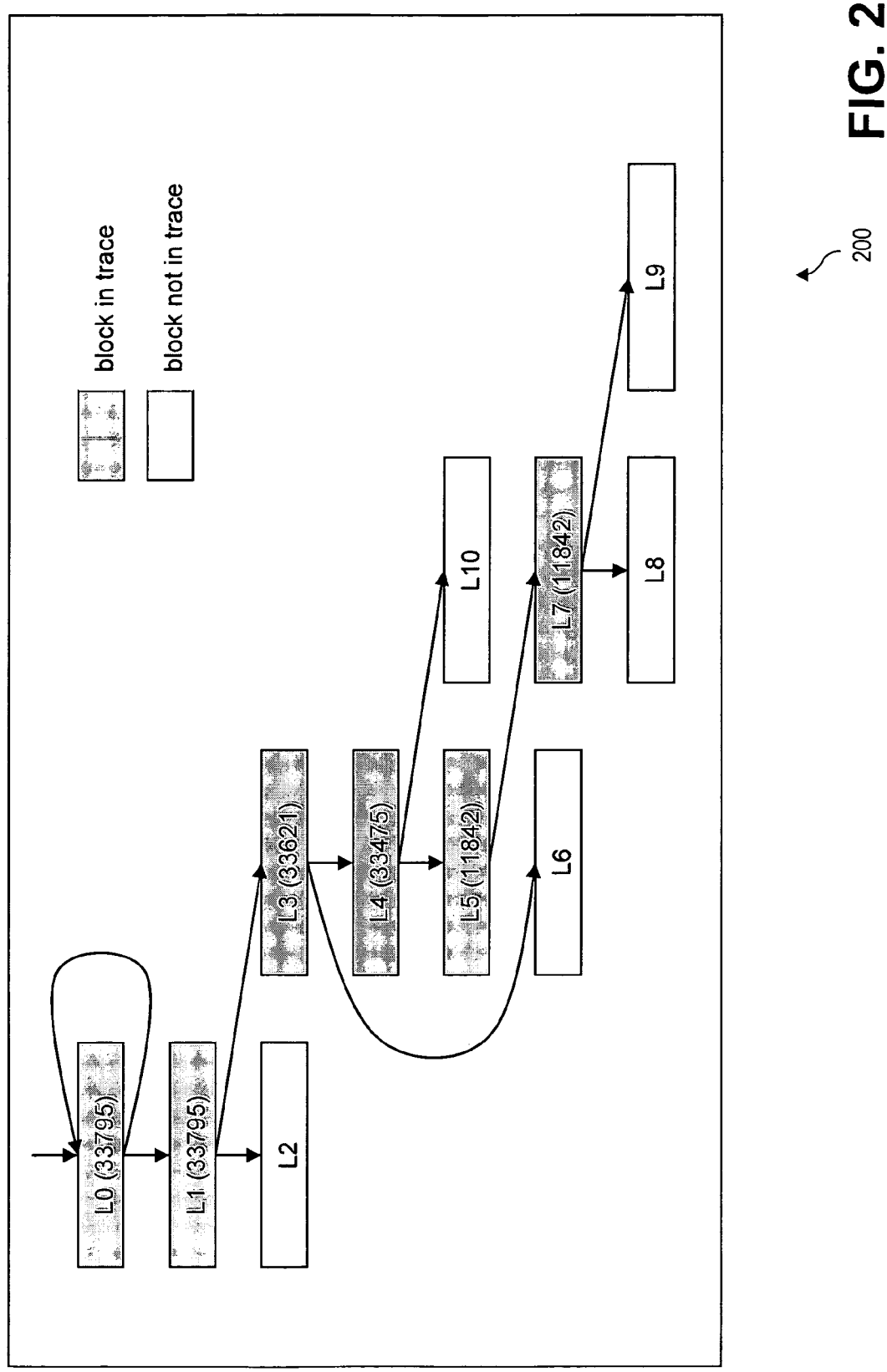
FIG. 2 is a diagram illustrating a control flow diagram in accordance with an embodiment of the present invention.

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Most recent execution tail (MRET) is a technique for hot trace selection. In MRET, the hot trace heads are first identified based on profiling information. In one embodiment, each loop head (e.g., a backward branch target) is treated as a candidate trace head. Each candidate trace head is instrumented such that a counter is incremented after each execution of the candidate trace head. When the counter exceeds a certain threshold, the candidate trace head becomes a hot trace head. Then the hot trace is simply selected as the execution path from the hot trace head to the most recent execution tail (an instruction that satisfies certain trace tail conditions). One major problem with this approach is that the most recent execution tail may be beyond the end of the hot trace, and thus, a poor hot trace selection is made.

Embodiments herein disclose a two-pass MRET (MRET$^2$) approach. In MRET$^2$, the hot trace is not simply selected as the execution path from a hot trace head to the most recent execution tail. Instead, hot traces are selected from at least two passes of MRET. In the first pass, the MRET approach is used to select one trace as a potential hot trace. A performance counter is then cleared, the counter is restarted, and another potential hot trace is selected using MRET in the second pass.

Thus, two potential hot traces are identified with the same hot trace head but possible different trace tails. The different trace tails indicate that even though the trace head is hot, the trace tails may not be hot. Embodiments of the MRET$^2$ approach select the hot trace as the common path of the two potential hot traces, which is likely to have both a hot head and a hot tail. Embodiments herein may use more than two passes.

FIG. 1 shows a trace 100 obtained with the MRET approach for the SPEC CPU2000 benchmark program GAP (Groups, Algorithms, and Programming) in accordance with an embodiment of the invention. SPEC CPU2000 (Standard Performance Evaluation Corporation Central Processing Unit 2000) is an industry-standardized benchmark suite.

Trace 100 shows code for blocks L0 to L10. A block is identified by its starting address, such as L0. A block includes a sequence of instructions that execute without branching. The instructions of the block are executed together from beginning to end.

FIG. 2 shows a control flow graph 200 for trace 100 for a single MRET pass in accordance with an embodiment of the invention. In graph 200, each block is identified by its starting address, such as starting address L0. For each block in trace 100, graph 200 also shows each block's execution count (collected by profiling the entire execution of the program). For example, block L0 has an execution count of 33795.

Figure 3:
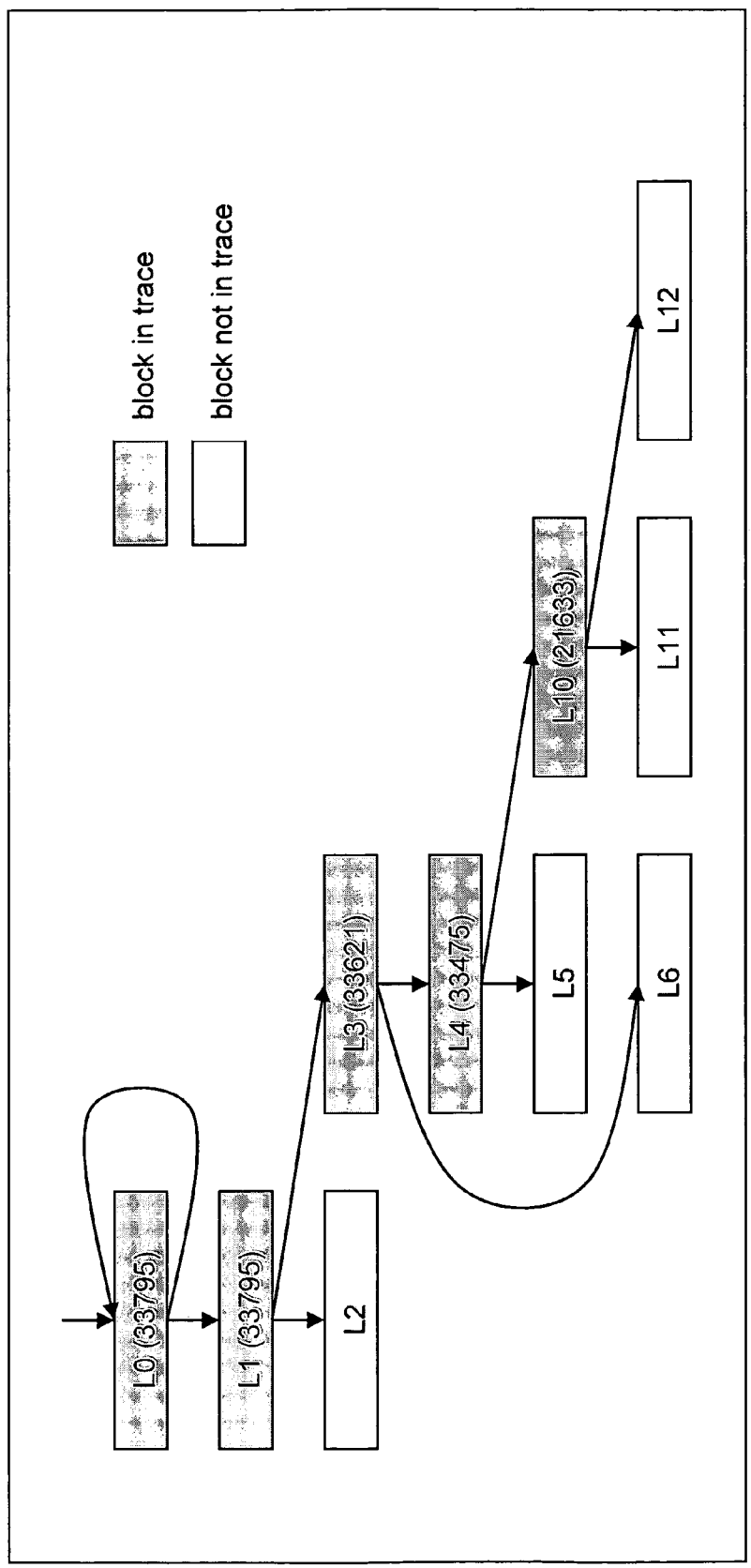
FIG. 3 is a diagram illustrating a control flow diagram in accordance with an embodiment of the present invention.

It will be understood that the execution count (also referred to as the total program execution count) shown in FIGS. 2 and 3 is available after the program has finished execution and may be used for analysis of hot trace selection. Embodiments herein select the hot trace before this execution count is known. During execution of MRET$^2$, a sampling is used in identifying the hot trace in accordance with embodiments herein (discussed further below).

The shaded blocks in graph 200 show a potential hot trace that includes L0, L1, L3, L4, L5 and L7. L0 is the trace head and L7 is the trace tail for this potential hot trace. For this trace, the execution count of the trace tail (block L7) is only about 35% (11842/33795) of the trace head (block L0). This may also be referred to as the trace completion rate (the percentage of executions that go through the whole trace). Thus, the trace tail (block L7) is not very "hot" because the trace tail executed many fewer times than the trace head.

FIG. 3 shows a control flow graph 300 of a second MRET pass in accordance with an embodiment of the invention. The second potential hot trace in FIG. 3 includes blocks L0, L1, L3, L4 and L10. The trace tail (block L10) has an execution count of 21633. The trace completion rate of the second potential hot trace is approximately 64% (21633/33795). Thus, the second MRET pass alone identified a poor hot trace.

The common path of the traces in FIG. 2 and FIG. 3 includes blocks L0, L1, L3 and L4. Thus, blocks L0, L1, L3 and L4 are selected as the hot trace. The completion rate of the selected hot trace (L0 to L4) is about 99% (33475/33795).

Embodiments of $MRET^2$ may result in a selected hot trace with the following features. The trace tail of the common path (block L4) is different than the trace tail from the first potential hot trace (block L7) and the trace tail of the second potential hot trace (block L10). Also, the trace tail of the common path (block L4) is earlier in the execution path than the trace tails of the potential hot traces (blocks L7 and L10).

MRET has low performance overhead and reasonably high accuracy in identifying loop heads as trace heads and the high frequent execution paths in loops as hot traces. However, not all loops have a single high frequent execution path. Some loops have multiple execution paths, but none of them is a high frequent execution path. MRET has no information on the execution frequencies of these paths and simply selects the most recently executed one as a hot trace. This leads to the low trace completion rate (the percentage of executions that go through the whole trace). Poor hot trace selection (traces with low trace completion rate) can result in a high penalty for trace optimizations such as instruction scheduling.

In embodiments of $MRET^2$, the hot trace is the common path of the two potential hot traces. This greatly reduces the possibility of selecting a bad trace, while keeping the low performance overhead of MRET trace selection. Experimental results using a dynamic binary translation prototype show the improved hot trace selections of embodiments of $MRET^2$ (discussed further below in conjunction with FIGS. 5 and 6).

IA32-EL (Intel Architecture 32 Execution Layer) instruments every block with performance counting to estimate the execution frequency of both trace heads and trace tails. That approach can obtain high trace completion rate. However, it has large performance overhead.

There exist hot trace selection algorithms using hardware performance counters. The sampling based hardware performance counter approach reduces the accuracy of hot trace identification. Moreover, the sampling of a hardware performance counter has performance overhead associated with the whole program execution, while the instrumentation based approach such as MRET has overhead associated only with trace selection phase, which is typically a short period of the whole program execution. Disabling the hardware sampling after a period of execution is not feasible as some hot traces begin execution late in the program's life.

Figure 4:
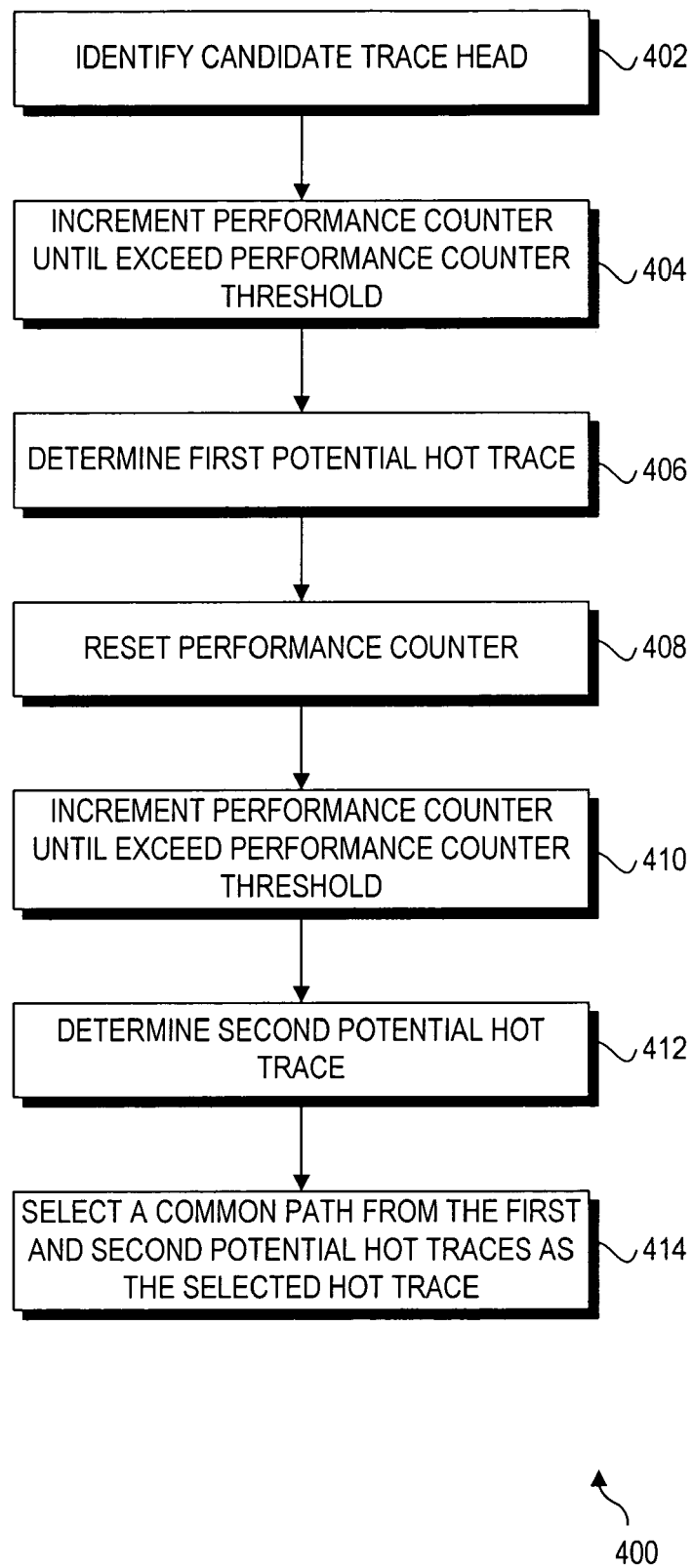
FIG. 4 is a flowchart illustrating the logic and operations of two-pass MRET trace selection in accordance with an embodiment of the present invention.

FIG. 4 shows a flowchart 400 of a $MRET^2$ hot trace selection algorithm in accordance with an embodiment of the invention. In one embodiment, the $MRET^2$ hot trace selection algorithm is used by StarDBT (Star Dynamic Binary Translation). StarDBT is a dynamic binary translation and optimization system of the Intel® Corporation. In alternative embodiments, flowchart 400 may be implemented by other dynamic optimizers, binary translators, and other dynamic instrumentation systems.

Starting in a block 402, a candidate trace head is identified. In one embodiment, heuristics used in MRET are used to identify the candidate trace head. In one embodiment, the candidate trace head is often the beginning of a loop.

Continuing to a block 404, a performance counter is incremented at each execution of the candidate trace head until a performance counter threshold is exceeded. In one embodiment, the performance counter threshold is approximately 100 executions of the candidate trace head. Embodiments of incrementing the performance counter include counters that count upward, downward, or other counter schemes.

Continuing to a block 406, the first potential hot trace is determined. Once the performance counter exceeds the performance counter threshold, the candidate trace head becomes the trace head. In one embodiment, the most recent execution tail is selected as the trace tail. Heuristics may be used to identify the trace tail. In one embodiment, the trace tail is often a loop end.

Continuing to a block 408, the performance counter is reset. In a block 410, the performance counter is incremented at each execution of the trace head until the performance counter threshold is exceeded.

Proceeding to a block 412, the second potential hot trace is determined. It will be appreciated that a second trace head is not identified. The trace head of the first potential hot trace is used as the trace head in the second potential hot trace. However, the second potential hot trace may include a second trace tail that is different than the first trace tail.

Continuing to a block 414, the logic selects the common path from the first and second potential hot traces as the selected hot trace. In one embodiment, the common path includes the blocks of the two potential hot traces that are identical.

Alternative embodiments may use additional MRET passes using the same trace head to identify other potential hot traces. In these embodiments, the selected hot trace includes the common path from all of the potential hot traces.

Embodiments of the $MRET^2$ hot trace selection algorithm may be implemented in the dynamic binary translator StarDBT. StarDBT may dynamically translate a legacy IA32 program to IA32-e instructions running on an EM64T (Intel® Extended Memory 64 Technology) machine.

StarDBT may perform two kinds of translation: cold code translation and hot code translation. In cold code translation, each IA32 instruction is translated to IA32-e instructions in a block unit and executed on an EM64T machine. In hot code translation, hot traces are selected during the cold code translation and the hot traces are optimized.

In one embodiment using StarDBT, the blocks in a trace are linked together to improve the instruction-cache locality. The linked blocks of the selected hot trace may all fit together into an instruction cache. If the blocks are not linked, but are separate, they may not all fit into the instruction cache.

Figure 5:
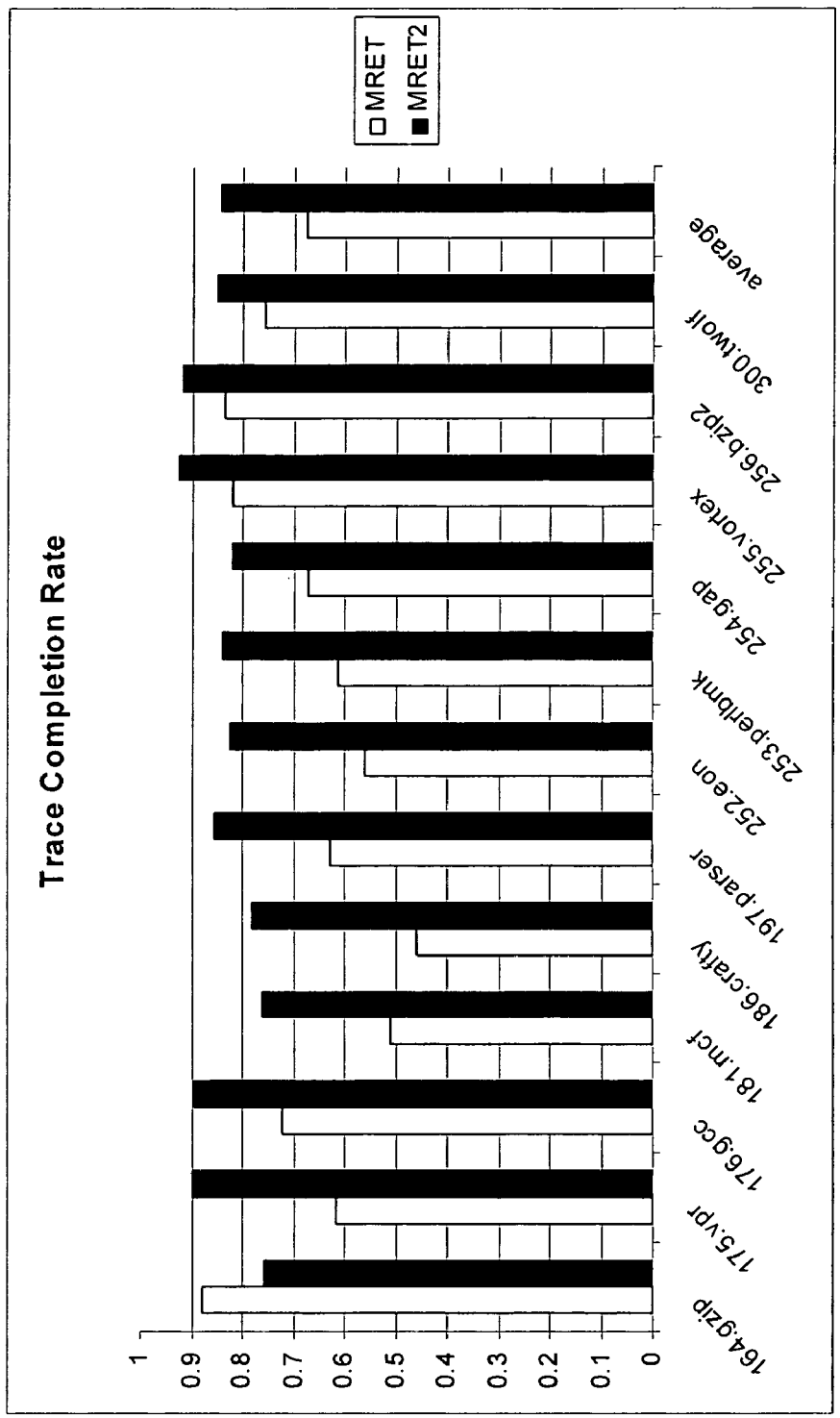
FIG. 5 is a graph showing test results of two-pass MRET trace selection in accordance with an embodiment of the present invention.
Figure 6:
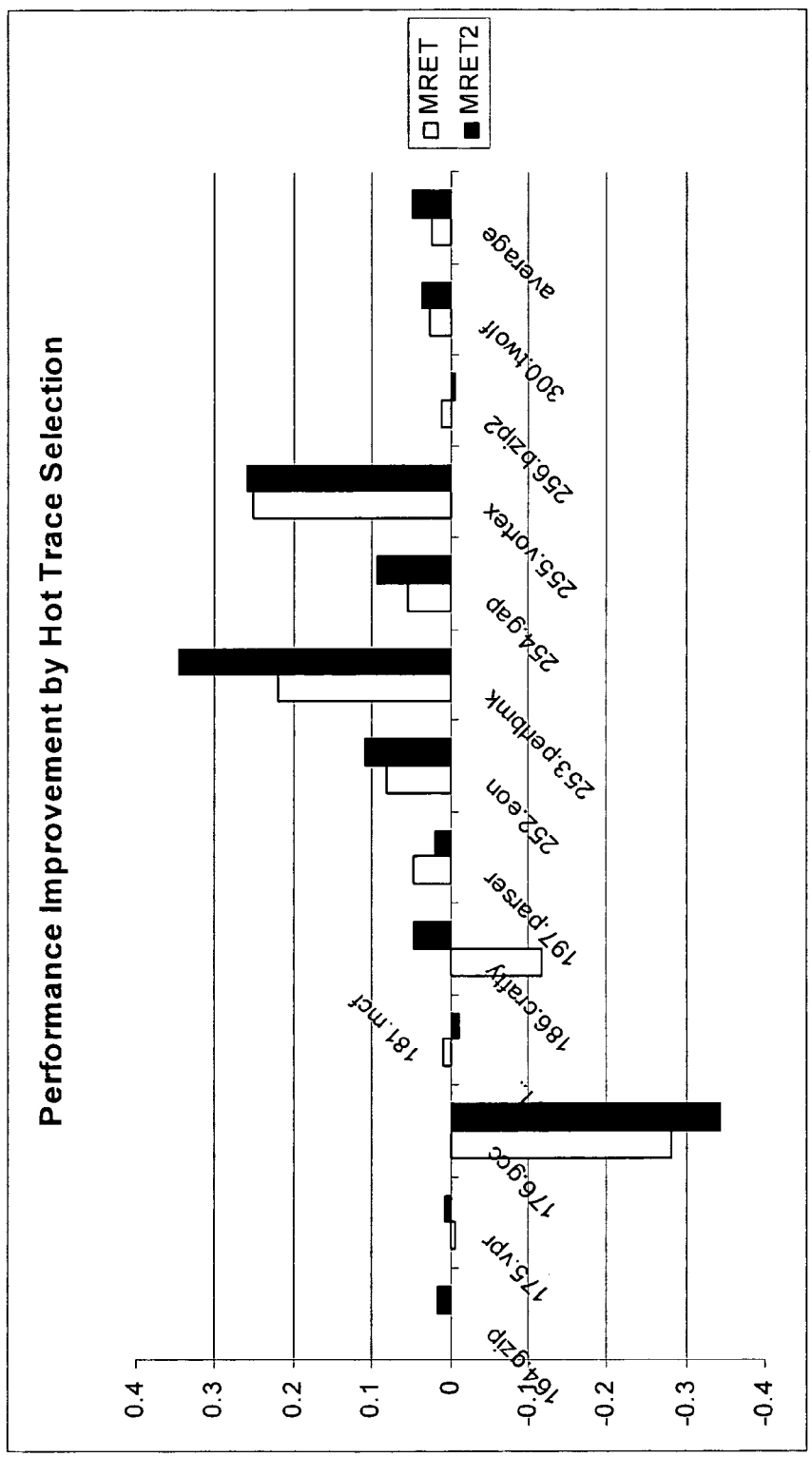
FIG. 6 is a graph showing test results of two-pass MRET trace selection in accordance with an embodiment of the present invention.

Experimental results using embodiments of the $MRET^2$ hot trace selection algorithm are shown in FIG. 5 and FIG. 6. The illustrated test benchmark programs are compiled by an Intel® Compiler with O3 (Optimization Level 3) optimization and profiling information. StarDBT may be compiled by a Microsoft Compiler with Release configuration. In FIGS. 5 and 6, an embodiment of the $MRET^2$ approach as described herein is compared to the MRET approach.

Referring to FIG. 5, a graph 500 of trace completion rate is shown. The trace completion rate shows the percentage of times the selected hot trace executed from beginning to end. The horizontal axis shows CINT2000 benchmark programs (integer component of SPEC CPU 2000) that are well known to one of ordinary skill in the art. The vertical axis shows the percentage of selected hot trace completion. The higher the completion rate, the better the selection of the hot trace.

An average of all the CINT2000 benchmark programs is shown by the right-most column. $MRET^2$ has an average trace completion rate of 84.4%, while MRET has an average trace completion rate of 67.2%.

Turning to FIG. 6, a graph 600 of program execution time performance improvement is shown. The horizontal axis shows CINT2000 benchmark programs that are well known to one of ordinary skill in the art. The vertical axis shows the percentage increase (or decrease) in program execution time using MRET and $MRET^2$ hot trace selection methods.

As shown by the average column at the right side of graph 600, $MRET^2$ provides performance improvement of 4.77%, while MRET provides only 2.42% performance improvement.

Embodiments herein provide a $MRET^2$ hot trace selection algorithm. Embodiments of $MRET^2$ may be especially useful for programs that execute a long time. The longer the execution time of a program, the more time that is available to perform $MRET^2$ and thus, gain the benefits of better hot trace selection with little impact from the increased hot trace selection overhead of $MRET^2$.

Embodiment of a Computer System

Figure 7:
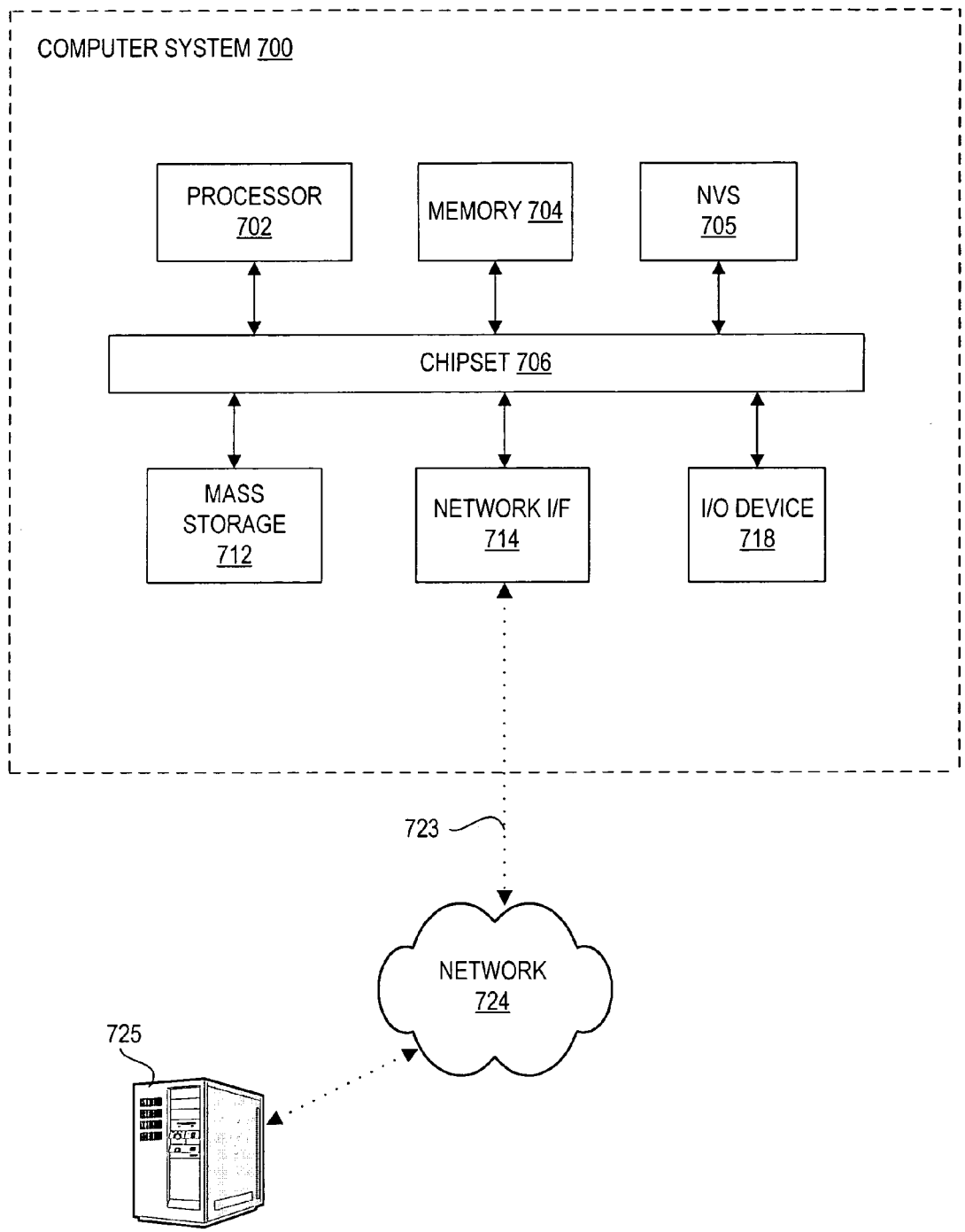
FIG. 7 is a diagram illustrating one embodiment of a computer system for implementing embodiments of the present invention.

FIG. 7 is an illustration of one embodiment of a computer system 700 on which embodiments of the present invention may be implemented. In one embodiment, computer system 700 may execute instructions for $MRET^2$ hot trace selection in accordance with embodiments herein.

Computer system 700 includes a processor 702 and a memory 704 coupled to a chipset 706. Mass storage 712, Non-Volatile Storage (NVS) 705, network interface (I/F) 714, and Input/Output (I/O) device 718 may also be coupled to chipset 706. Embodiments of computer system 700 include, but are not limited to, a desktop computer, a notebook computer, a server, a personal digital assistant, a network workstation, or the like. In one embodiment, computer system 700 includes processor 702 coupled to memory 704, processor 702 to execute instructions stored in memory 704.

Processor 702 may include, but is not limited to, an Intel® Corporation x86, Pentium®, Xeon®, or Itanium® family processor, or the like. In one embodiment, computer system 700 may include multiple processors. In another embodiment, processor 702 may include two or more processor cores.

Memory 704 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. In one embodiment, memory 704 may include one or more memory units that do not have to be refreshed.

Chipset 706 may include a memory controller, such as a Memory Controller Hub (MCH), an input/output controller, such as an Input/Output Controller Hub (ICH), or the like. In an alternative embodiment, a memory controller for memory 704 may reside in the same chip as processor 702. Chipset 706 may also include system clock support, power management support, audio support, graphics support, or the like. In one embodiment, chipset 706 is coupled to a board that includes sockets for processor 702 and memory 704.

Components of computer system 700 may be connected by various interconnects. In one embodiment, an interconnect may be point-to-point between two components, while in other embodiments, an interconnect may connect more than two components. Such interconnects may include a Peripheral Component Interconnect (PCI), such as PCI Express, a System Management bus (SMBUS), a Low Pin Count (LPC) bus, a Serial Peripheral Interface (SPI) bus, an Accelerated Graphics Port (AGP) interface, or the like. I/O device 718 may include a keyboard, a mouse, a display, a printer, a scanner, or the like.

Computer system 700 may interface to external systems through network interface 714. Network interface 714 may include, but is not limited to, a modem, a Network Interface Card (NIC), or other interfaces for coupling a computer system to other computer systems. A carrier wave signal 723 may be received/transmitted by network interface 714. In the embodiment illustrated in FIG. 7, carrier wave signal 723 is used to interface computer system 700 with a network 724, such as a Local Area Network (LAN), a Wide Area Network (WAN), the Internet, or any combination thereof. In one embodiment, network 724 is further coupled to a computer system 725 such that computer system 700 and computer system 725 may communicate over network 724.

Computer system 700 also includes non-volatile storage 705 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like.

Mass storage 712 includes, but is not limited to, a magnetic disk drive, such as a hard disk drive, a magnetic tape drive, an optical disk drive, or the like. It is appreciated that instructions executable by processor 702 may reside in mass storage 712, memory 704, non-volatile storage 705, or may be transmitted or received via network interface 714.

In one embodiment, computer system 700 may execute an Operating System (OS). Embodiments of an OS include Microsoft Windows®, the Apple Macintosh operating system, the Linux operating system, the Unix operating system, or the like.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., Read-Only Memory (ROM), Random Access Memory (RAM), magnetic disk storage media, optical storage media, a flash memory device, etc.).

Various operations of embodiments of the present invention are described herein. These operations may be implemented by a machine using a processor, an Application Specific Integrated Circuit (ASIC), a Field Programmable Gate Array (FPGA), or the like. In one embodiment, one or more of the operations described may constitute instructions stored on a machine-accessible medium, that when executed by a machine will cause the machine to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description. The terms used in the following claims should not be construed to limit the invention to the specific embodiments disclosed in the specification. Rather, the following claims are to be construed in accordance with established doctrines of claim interpretation.

What is claimed is:

1. In a trace optimization system, a method comprising:
selecting a hot trace head from a plurality of candidate hot trace heads based on frequency of execution counts for each of the plurality of the candidate hot trace heads relative to a threshold;
determining a first potential hot trace of a program having a plurality of execution blocks, wherein the first potential hot trace comprises a first execution path through a first subset of the plurality of execution blocks of the program from the hot trace head to a first hot trace tail;
determining a second potential hot trace of the program, wherein the second potential hot trace comprises a second execution path through a second subset of the plurality of execution blocks of the program from the hot trace head to a second hot trace tail, wherein the first hot trace tail and the second hot trace tail are different; and
selecting a common path from the first potential hot trace and the second potential hot trace as a hot trace of the program, wherein the common path comprises the execution blocks that are identical between the first subset and the second subset of the plurality of execution blocks of the program, and wherein the common path further comprises the hot trace head and a third trace tail, wherein the third trace tail is distinct from the first and second trace tails and wherein the third trace tail is common to both the first execution path and the second execution path.

2. The method of claim 1:
wherein the hot trace head is a loop head having the most frequent execution rate from among the plurality of candidate hot trace heads;
wherein the first hot trace tail comprises the last execution block of the first subset of execution blocks in the first execution path;
wherein the second hot trace tail comprises the last execution block of the second subset of execution blocks in the second execution path; and
wherein the last execution block of the first subset of execution blocks and the last execution block of the second subset of execution blocks are not the same execution block.

3. The method of claim 1, wherein determining the first potential hot trace of the program includes:
updating a performance counter after each execution of the plurality of candidate hot trace heads; selecting the hot trace head form the plurality of candidate hot trace heads when the candidate hot trace head selected as the hot trace head has exceeded the threshold; and
determining the first hot trace tail of the first potential hot trace after the performance counter has exceeded the threshold.

4. The method of claim 1, further comprising resetting the performance counter before determining the second potential hot trace and the second hot trace tail.

5. The method of claim 1, wherein the first potential hot trace is selected using a Most Recent Execution Tail (MRET) algorithm.

6. The method of claim 1, wherein the second potential hot trace is selected using a Most Recent Execution Tail (MRET) algorithm.

7. A machine-accessible medium having instructions stored thereon that, when executed by a processor in a machine, the processor will cause the machine to perform a method comprising:
determining a first potential hot trace of a program, wherein the first potential hot trace includes a hot trace head and a first hot trace tail;
determining a second potential hot trace of the program, wherein the second potential hot trace includes the hot trace head and a second hot trace tail, wherein the second hot trace tail is different than the first hot trace tail; and
selecting a common path from the first potential hot trace and the second potential hot trace as a hot trace of the program, wherein the common path includes a subset of execution blocks that are identical between a plurality of execution blocks of the program through which the first potential hot trace of the program and the second potential hot trace of the program each traverse, and wherein the common path includes the hot trace head and a third hot trace tail, wherein the third hot trace tail is distinct from the first and second hot trace tails and wherein the third trace tail is common to both a first execution path traversed through the plurality of execution blocks by the first potential hot trace of the program and a second execution path traversed through the plurality of execution blocks by the second potential hot trace of the program.

8. The machine-accessible medium of claim 7 wherein the method further comprises: identifying the hot trace head from a plurality of candidate hot trace heads based on frequency of execution counts for each of the plurality of the candidate hot trace heads relative to a threshold.

9. The machine-accessible medium of claim 8, wherein determining the first potential hot trace of the program includes:
incrementing a performance counter after each execution of the candidate hot trace head; and
determining the first hot trace tail after the performance counter has exceeded the threshold, wherein the candidate hot trace head becomes the hot trace head.

10. The machine-accessible medium of claim 9, wherein the method further comprises:
resetting the performance counter before determining the second potential hot trace.

11. The machine-accessible medium of claim 9, wherein the threshold is approximately 100 executions of the candidate trace head.

12. The machine-accessible medium of claim 7, wherein the first potential hot trace and the second potential hot trace are selected using a Most Recent Execution Tail (MRET) algorithm.

13. A system, comprising:
a processor;
means for determining a first potential hot trace of a program, wherein the first potential hot trace includes a hot trace head and a first hot trace tail;
means for determining a second potential hot trace of the program, wherein the second potential hot trace includes the hot trace head and a second hot trace tail; and
means for selecting a common path from the first potential hot trace and the second potential hot trace as a hot trace of the program, wherein the common path includes a subset of execution blocks that are identical within a plurality of execution blocks of the program through which the first potential hot trace of the program and the second potential hot trace of the program each traverse, wherein the common path further comprises the hot trace head and a third trace tail, and wherein the third trace tail is distinct from the first and second trace tails and wherein the third trace tail is common to both a first execution path traversed by the first potential hot trace of the program and a second execution path traversed by the second potential hot trace of the program.

14. The system of claim 13, wherein determining the first potential hot trace of the program includes:

means for identifying the hot trace head from a plurality of candidate hot trace heads based on frequency of execution counts for each of the plurality of the candidate hot trace heads relative to a threshold;

means for incrementing a performance counter after each execution of the hot trace head; and means for determining the first hot trace tail after the performance counter has exceeded the threshold, wherein the candidate trace head becomes the hot trace head.

15. The system of claim 13, wherein the system is a dynamic optimizer.

* * * * *